Patented Feb. 4, 1930

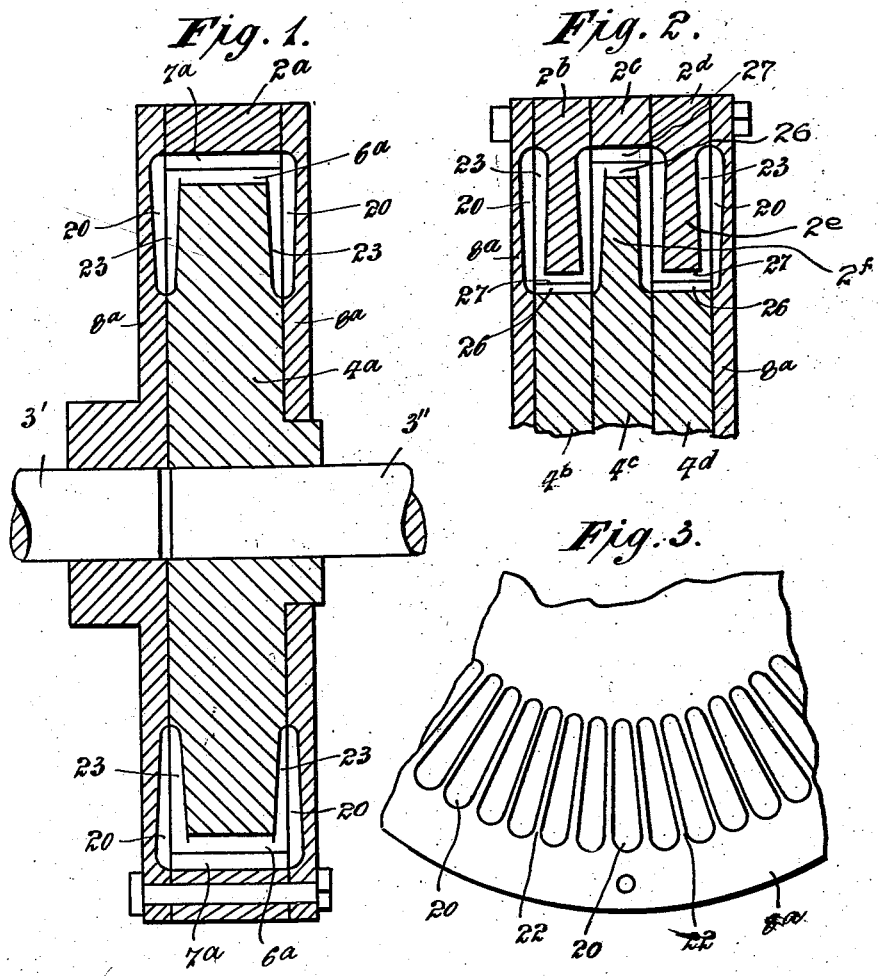

1,746,148

UNITED STATES PATENT OFFICE

WILLIAM TREAVOURS EATON, OF WANGANUI, NEW ZEALAND, ASSIGNOR OF ONE-HALF TO WILLIAM GAMBLES, OF WANGANUI, NEW ZEALAND

RESILIENT SHAFT COUPLING

Original application filed June 18, 1926, Serial No. 116,964, and in Australia July 10, 1925. Divided and this application filed September 21, 1927. Serial No. 221,051.

This invention, which is a division of my application No. 116,964, filed June 18, 1926, relates to clutches, couplings, shock absorbers and the like, of the kind having an outer member adapted to be locked to a concentrically arranged inner member by means of fluid introduced into common spaces between the members, and comprising an outer ring-like member arranged concentrically around an inner circular member, and the adjacent peripheral faces of the members are recessed transversely to form the spaces into which the fluid is introduced.

According to the present invention the inner and outer members are each provided with radial recesses joining with the peripheral transverse recesses whereby when the recesses register, radial spaces each communicating with individual transverse spaces are formed between the members for the reception of the fluid effecting the flexible lock between the members.

In one form of device according to the invention side plates or cheeks carried by the outer member have their inner working faces recessed in places joining with the transverse recesses of the said member, and the adjacent working faces of the inner member are provided with corresponding recesses joining with the transverse recesses in its periphery so that when the recesses register radial spaces each communicating with the individual transverse spaces are formed.

It will be understood that the parts and recesses may be arranged in multiple to increase the power of the device.

In the accompanying drawings,—

Figure 1 is a cross sectional view of a device according to the invention.

Figure 2 shows a modification in cross section, and

Figure 3 is a side elevation of one of the parts seen in both of the above two figures.

Referring to Figs. 1 and 3, the outer ring-like member $2^a$ having side cheeks $8^a$, encloses the inner circular member $4^a$. A shaft $3'$ supports the outer member and a shaft $3''$ supports the inner member. The adjacent peripheral faces of the two members are provided with an equal number of recesses $6^a$ and $7^a$, the recesses $7^a$ joining with radial recesses 20 formed in the side cheeks and the recesses $6^a$ joining with recesses 23 formed in the outer working faces of the inner member adjacent the working faces of the cheeks. With this arrangement the fluid is introduced into the spaces formed by the registering recesses and the flexible fluid lock results due partly to the transverse recesses and partly to the radial recesses.

The recesses 20 taper inwardly so that the ridges 22 between them are of substantially equal width.

Referring to Fig. 2, the outer clutch member comprises two cheek plates $8^a$, between which are bolted peripheral annular members $2^b$, $2^c$ and $2^d$. Of these, the extreme members are provided with radial webs $2^e$ formed by series of depressions 23 in opposite sides of the members $2^b$ and $2^d$. The intermediate section $2^c$ is of shallow thickness in order to accommodate the projecting intermediate portion $2^f$ of the inner clutch member.

The latter member comprises also the element $4^b$ and $4^d$ which are of relatively small diameter so as to fit rotatably within the circular openings defined by the webbed portions of the members $2^b$ and $2^d$.

The portion $2^f$ of the inner member is provided on its opposite sides with series of depressions adapted to register with adjacent depressions in the members $2^b$ and $2^d$, thereby forming recesses, the lines of junction between said members intersecting said recesses. The radial recesses are connected by transverse recesses formed by depressions 26 and 27, provided respectively in the cylindrical coacting faces of the respective relatively rotating parts.

When the recesses are in register a series of intercommunicating spaces is formed and upon the introduction of the fluid into these spaces a flexible lock is formed between the inner and outer members.

The recesses in these devices may be simply filled with oil or the device may have an oil chamber or reservoir from which the oil would pass under centrifugal action to the recesses. If the recesses are filled with oil under pressure the power of the lock between the parts will be further increased.

What I claim is:—

1. In a gradual take-up transmission device, driving and driven elements, one comprising a circular member having a peripheral face, said member being provided with an endless series of recesses, each including a portion extending transversely of said face, and radial portions formed in the sides of said circular member, joining said transverse portion, and the other element comprising a channelled member surrounding said circular member having an inner peripheral wall slidably fitting the peripheral wall of said circular member, and inner side walls slidably fitting the side walls of said circular member, the channelled member having a corresponding endless series of recesses each including a transverse portion in the peripheral wall and radial portions in the side walls, the recesses in said driving and driven elements being adapted to register in certain relative positions of said elements, and viscous fluid filling said recesses.

2. A gradual take-up transmission device as claimed in claim 1, the coacting faces of said members comprising channels on the one interleaving with a flange on the other, the said recesses in both members following the alternately radial and transverse course determined by the relation of said flanges.

In testimony whereof I have signed my name to this specification.

WILLIAM TREAVOURS EATON.